United States Patent Office 2,919,290
Patented Dec. 29, 1959

2,919,290

ACYCLIC CARBINOLS AND ESTERS AND METHOD OF PREPARATION OF THE ESTERS

Robert L. Webb, Jacksonville, Fla., assignor to The Glidden Company, Cleveland, Ohio, a corporation of Ohio No Drawing. Application November 7, 1955
Serial No. 545,523

15 Claims. (Cl. 260—488)

This invention is concerned with the conversion of unsaturated hydrocarbons of the 2,6-dimethyl octane series to primary alcohols and their esters useful in perfumery.

A number of unsaturated alcohols possessing a carbon skeleton corresponding to 2,6-dimethyl octane occur in nature, as is known, and are important ingredients of essential oils used by the perfumer. Among these are geraniol, linalool, citronellol and the like. I have now found that carbinols and their esters produced from substituted octenes and octadienes possessing the carbon structure of 2,6-dimethyl octane have very pleasant characteristic odors which make them useful in perfumery also.

It is known to condense certain reactive monocyclic and dicyclic terpenes with formaldehyde to produce cyclic primary alcohols containing eleven carbon atoms. There are two acyclic terpenes readily produced from the pinenes which are domestically abundant. One of these is alloocimene produced by pyrolysis of alpha-pinene, and the other is myrcene produced by pyrolysis of beta pinene. These two acyclic trienes react with formaldehyde, but their high degree of unsaturation makes them particularly susceptible to polymerization on thermal or acid treatments such as those necessary to provoke reaction of formaldehyde and terpene. Therefore, it is not satisfactory to utilize such terpenes for reaction with formaldehyde to produce acyclic alcohols of eleven carbon atoms.

I have now found that while the trienes, myrcene and alloocimene are not satisfactory for reaction with formaldehyde to produce high yields of valuable alcohols, their less highly unsaturated derivatives are capable of reacting with formaldehyde to provide valuable unsaturated eleven carbon atom primary alcohols and in high yields.

It is therefore an object of my invention to condense selectively reduced myrcene and alloocimene with formaldehyde to produce eleven carbon atom acyclic unsaturated alcohols.

It is a further object to convert alloocimene to eleven carbon atom unsaturated primary alcohols.

It is a further object to convert myrcene to eleven carbon atom unsaturated primary alcohols.

It is a further object to produce esters valuable in perfumery from acyclic trienes.

It is a further object to produce dihydro and tetrahydro acyclic terpene carbinols and their esters.

Another object is to provide new primary aliphatic alcohols and their esters useful in perfumery.

Other objects of my invention will be evident from the following description of my invention and from the examples.

As hydrocarbon raw material, I employ 2,6-dimethyl octenes and 2,6-dimethyl octadienes and their terminal methylenic isomers containing at least one double bond involving a trialkylated carbon atom, i.e., containing the groupings

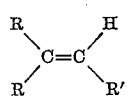

where R is alkyl and where R' is alkyl or hydrogen.

Desirable raw materials include the monoolefins 2,6-dimethyl-2-octene, which can be produced by hydrogenation of myrcene, see du Pont and Desreux, Compte Rendus, volume 203, pp. 722–736; 2,6-dimethyl-5-octene and 2,6-dimethyl-6-octene produced by du Pont et al., Bulletin Societe Chemique de France, volume 5, pp. 322–336 (1938), and which can be produced by acid dehydration of tetrahydrolinalool.

Desirable diolefins include 2-methyl, 6-methylene-2-octene, 2,6-dimethyl-2,7-octadiene and 2,6-dimethyl-2,6-octadiene which can be produced from myrcene as shown in the examples. The 2,6-dimethyl-2,7-octadiene can also be produced by pyrolysis of pinane, Pines et al., J. Am. Chem. Soc., volume 76, p. 4412 (1954).

It is to be noted that this latter compound is also properly named 3,7-dimethyl-1,6-octadiene, but the compounds are designated as derivatives of 2,6-dimethyl-octane throughout this disclosure, so that the interrelationships of hydrocarbons and their carbinol derivatives is more readily apparent.

It is evident from the above that hydrocarbons suitable for processing according to the invention can be produced by chemical or catalytic reduction of myrcene or alloocimene, and that also, of course, these desired hydrocarbons could be produced in other ways if it were found economically desirable to do so.

In one form of the invention, to accomplish a condensation of the partially hydrogenated acyclic terpene with formaldehyde, it is necessary only to heat formaldehyde and the hydrocarbon to about 240° C. or above and condensation will take place. The condensation is quite unlike that of, say, beta-pinene with formaldehyde, in that this latter reaction proceeds at substantially lower temperatures and with formation of the free alcohol, nopol; see Bain, Patent No. 2,340,294, issued February 1, 1944. Also, if beta-pinene were treated under these conditions, the initially formed bicyclic alcohol, nopol, could be almost entirely destroyed thermally with formation of monocyclic alcohols, polymers, etc. In the instant case, however, little free alcohol is produced and the product isolated is the formate of the alcohol. Further, the alcohol, as its formate, is stable at the temperatures employed, and little or no isomerization and/or polymerization is encountered. Although the exact mechanism of formation of the formate of the hydrocarbon-formaldehyde adduct is not known, it is evident that disproportionation of the formaldehyde takes place. It is known to heat formaldehyde to produce methanol and formic acid, see Walker, Formaldehyde, Reinhold Publishing, New York (1944), p. 106. It is evident then that only part of the formaldehyde employed is useful in forming the hydrocarbon-formaldehyde adduct and that a part is used to produce the formyl group.

The molar proportions of hydrocarbon and formaldehyde employed are not critical, but I find it convenient to employ about 15 to 35% formaldehyde based on the weight of the hydrocarbon taken. If ordinary aqueous 35 to 40% formaldehyde is employed, little or no ester is produced, and therefore it is convenient to employ formaldehyde in the form of one of its polymers, such as one of the commercial grades of paraformaldehyde. The paraformaldehyde ordinarily contains 5 to 10% of water, but this small amount of water is not objectionable. Formaldehyde can also be generated, as is known, from trioxane.

The temperature employed is not critical, but reaction is uneconomically slow at 220° C. or below, and since it proceeds satisfactorily within the temperature range of 250 to 285° C., I prefer to operate at such temperatures. Very high temperatures, say, above 300° C., are unnecessary, though they can be employed, particularly when short reaction times are employed as in a continuous process.

The reaction is best conducted using an autoclave under autogenous pressure, since otherwise such reaction temperatures as are necessary could be attained only in vapor phase. Inert gas such as nitrogen can be employed, but would not be useful except in facilitating the mechanics of continuous processing when that is employed.

The time required to substantially complete the reaction will vary with the temperature employed. Thus, in general 10 hours at 250° C. may be required and only, say, two hours or less at 285° C.

After the reaction is substantially complete, the product will be found to be rich in the unchanged olefin and in the formate of the carbinol produced by condensation of the olefin with formaldehyde. It is to be noted that in the reaction, the double bond at the point of attack is shifted to an adjacent position. The time required to completely react all of the formaldehyde is excessive, and ordinarily unreacted formaldehyde in small proportion will be found in the crude product. The crude product can be worked up by distillation if desired, but ordinarily we prefer to wash the product with water or preferentially a reagent capable of destroying unreacted formaldehyde prior to the distillation step. Some free alcohol may be present in the crude reaction mixture, and small quantities are usually present after the washing step because of some hydrolysis of the formate. Any unreacted hydrocarbon is readily recovered by distillation and may be reused in a subsequent reaction. If the free carbinol is desired, the formate can be saponified very readily with caustic either prior or subsequent to isolation from the crude reaction mixture.

In a second form of my invention, I have found that the reaction of formaldehyde and the olefin will proceed at much lower temperatures if a low molecular weight fatty acid is added to a mixture of a mole of formaldehyde and a mole of hydrocarbon, this mixture need be heated to only, say, 150° C. in order to secure a satisfactory reaction between the hydrocarbon and the formaldehyde. For example, acetic acid can be employed to bring about the condensation and in this case little or no formate is produced, but the product is rich in the acetate of the formaldehyde-olefin condensate. All of the formaldehyde employed, therefore, is available for reaction with the olefin, as little or none of it is converted to formic acid or other formaldehyde decomposition products. We find also that acids such as formic acid, propionic acid, maleic acid, chloracetic acid, etc. are satisfactory acids to employ the lower temperature addition of the formaldehyde to the olefin. In each case, the ester corresponding to the acid employed is obtained. The ratio of reactants is not critical, but quite satisfactory yields are obtained by employing about one to three equivalents of acid per mole of hydrocarbon. Also the proportion of formaldehyde in relation to hydrocarbon and acid is not critical, but, in general, good yields are obtained when hydrocarbon and formaldehyde are used in about equal molar ratios.

The reaction of formaldehye and olefin in the presence of a carboxylic acid will take place readily at atmospheric pressure, but since formaldehyde dissociates rather rapidly at around 120° C. under these conditions, the temperature of the reaction cannot be raised substantially above this point without incurring some loss of formaldehyde. The reaction is quite slow at temperatures below 100° C. and rather rapid at temperatures above 130° C. I therefore prefer to employ an autoclave and operate the reaction at above 130° C. in order to secure rapid conversions. The reaction products are relatively stable and high temperatures say, 175° C. and above could be employed, but such temperatures are not required and, of course, would induce more rapid corrosion of equipment and present more processing hazards since pressures would be higher. I therefore prefer to operate within the range of about 135° C. to 160° C. and under autogenous pressures, i.e., about 10 to 80 pounds p.s.i.g. Where lower temperatures are employed, say, 135° to 145° C., the reaction time may be 6 to 15 hours using acetic acid, whereas at temperatures of 150° to 160° C., the time required will be found to be about 3 to 10 hours. In general, strong acids such as formic, chloracetic and the like cause much more rapid reaction than weaker acids like butyric and hexoic.

If a volatile carboxylic acid is employed, the reaction mixture can be distilled to recover excess volatile acid, and unreacted hydrocarbon and the ester produced can be distilled and purified, or it can be saponified in order to produce the corresponding alcohol.

The purified alcohols and their more volatile esters will be found to possess pleasant characteristic odors of fragrant perfume type. The various esters of the alcohols can be produced by employing the proper acid in conducting the formaldehyde-olefin condensation, but they can likewise be produced by esterifying the free alcohol with an acid, acid chloride, acid anhydride, etc., or the esters can be produced by alcoholysis or ester exchange.

Since the alcohols are primary alcohols, they are readily converted to aldehydes by chromic acid oxidation or to acids by the same means. They can be hydrogenated either prior or subsequent to such oxidation.

In general, I prefer to employ purified olefins for condensation with formaldehyde in order to obtain pure carbinols. Mixed olefins can be employed if desired, however.

The following examples are illustrative:

Example 1

One mole of hydrogen was added to 1500 grams of myrcene, 95–98%, in the presence of 1.0% by weight of nickel catalyst at 85–100° C. under a hydrogen pressure of 40–60 p.s.i.g. The hydrogenation product was filtered to remove catalyst. Fractionation through an efficient column followed by infrared spectro-analysis of the fractions indicated that the hydrogenation product was 90–95% 2-methyl-6-methylene-2-octene, B.P.$_{100\text{ mm.}}$, 100–101° C., $N_D^{25}$ 1.4439, $D_4^{25}$ 0.7669, and 8–10% 2,6-dimethyl-2,7-octadiene, B.P. $_{100\text{ mm.}}$, 94.5° C., $N_D^{25}$ 1.4363, $D_4^{25}$ 0.7583.

IDENTIFICATION OF COMPOUNDS

The compound boiling at 94.5° C. at 100 mm. contained a monosubstituted ethylenic double bond, a vinyl group and a trisubstituted ethylenic bond, as shown by the presence of the characteristic monosubstituted ethylenic and trisubstituted ethylenic bond absorptions in the infrared spectrum at 11.0$\mu$ and 12.3$\mu$, respectively. The catalytic addition of 1 mole of hydrogen to the hydrocarbon at 25–35° C. in the presence of 0.2% by weight of $PtO_2$ under a hydrogen pressure of 40–60 p.s.i.g. gave 2,6-dimethyl-2-octene, B.P.$_{100\text{ mm.}}$ 99° C., $N_D^{25}$ 1.4286, $D_4^{25}$ 0.752. From the above data, it is evident that the compound boiling at 94.5° C. at 100 mm. is 2,6-dimethyl-2,7-octadiene.

The compound boiling at 100–101° C. at 100 mm. contained a disubstituted terminal methylene group and a trisubstituted ethylenic bond, as shown by the presence of the characteristic disubstituted terminal methylene and trisubstituted ethylenic bond absorptions in the infrared spectrum at 11.3$\mu$ and 12.3$\mu$, respectively. The catalytic addition of one mole of hydrogen as shown above gave 2,6-dimethyl-2-octene as determined by infrared spectro-analysis. From the above data, it is evident that the compound boiling at 100–101° C. at 100 mm. is 2-methyl-6-methylene-2-octene.

Example 2

One mole of hydrogen was added to 1500 grams of myrcene, 95–98%, in the presence of 0.2% by weight of 5.0% Pd on carbon at 25–35° C. under a hydrogen pressure of 40–60 p.s.i.g. The hydrogenation product was filtered to remove catalyst and fractionated through an efficient column at 100 mm. pressure. Infrared spectroanalysis of the fractions indicated that the hydrogenation product was: 65–70% trans-2,6-dimethyl-2,6-octadiene, B.P., $_{100\ mm.}$, 102° C., $N_D^{25}$ 1.4438, $D_4^{25}$ 10.7911 and 30–35% cis-2,6-dimethyl-2,6-octadiene, B.P. $_{100\ mm.}$ 104° C., $N_D^{25}$ 1.4500, $D_4^{25}$ 0.8055.

Example 3

To moles of hydrogen was added to 1500 grams of myrcene, 95–98%, in the presence of 1.0% by weight of nickel catalyst, nickel content=25%, at 85–100° C. under a hydrogen pressure of 40–60 p.s.i.g. The hydrogenation product was filtered to remove catalyst. Fractionation at 100 mm. followed by infrared spectroanalysis of the fraction indicated that the hydrogenation product was 93–95% 2,6-dimethyl-2-octene, B.P. $_{100\ mm.}$ 99° C., $N_D^{25}$ 1.4268, $D_4^{25}$ 0.752.

Example 4

Five hundred grams of 2,6-dimethyl-2-octene and 110 grams of paraformaldehyde (91%) were heated in an autoclave at 250–260° C. for 8 hours. The maximum pressure developed was 300 p.s.i.g. The reaction mixture was then washed with a 25% NaOH solution to remove unreacted formaldehyde. Infrared spectroanalysis of the reaction product (573 grams) indicated that it was a mixture of alcohol and ester. Saponification by stirring the reaction product with an excess of 25% NaOH solution gave 521 grams of saponified oil. Fractionation at 10 mm. followed by infrared spectroanalysis of the fractions indicated that the saponified oil was 62–65% unchanged 2,6-dimethyl-2-octene, 28–32% 2,6-dimethyl-1-octene-3-carbinol, B.P. $_{10\ mm.}$ 105–106° C., $N_D^{25}$ 1.4521, $D_4^{25}$ 0.8506, and 9% residue.

Infrared spectroanalysis of the alcohol showed it to be a primary alcohol containing a disubstituted terminal methylenic double bond as shown by the presence of the characteristic primary alcohol and disubstituted terminal methylene absorptions at $9.6\mu$ and $11.3\mu$, respectively. Dehydration of the unsaturated alcohol by cooking it with $Al_2O_3$ at 220–240° C. gave a hydrocarbon containing two disubstituted terminal methylene groups as shown by the intensity of the characteristic disubstituted terminal methylene group absorption in the infrared spectrum at $11.3\mu$. Ultraviolet spectroanalysis of the hydrocarbon indicated that the two disubstituted terminal methylene groups were conjugated as shown by the presence of an absorption peak at 229 m$\mu$. In the absence of any unlikely rearrangement of the carbon skeleton during the condensation with paraformaldehyde or during the dehydration of the primary alcohol, the dehydration product must be 2,6-dimethyl-3-methylene-1-octene. Thus, the primary alcohol must have been 2,6-dimethyl-1-octene-3-carbinol.

Example 5

Five hundred grams of 2,6-dimethyl-2,6-octadiene, a mixture of cis and trans forms, and 118 grams of paraformaldehyde, 91%, were heated in an autoclave at 250–260° C. for 8 hours. The maximum pressure developed was 325 p.s.i.g. The product was recovered and saponified with an excess of a 25% NaOH solution. 517 grams of saponified oil was recovered. Fractionation of the saponified oil followed by infrared spectroanalysis of the fractions indicated that the oil was 60–65% unchanged 2,6-dimethyl-2,6-octadiene, 25–28% 2,6-dimethyl-1,6-octadiene-3-carbinol, B.P. $_{10\ mm.}$ 109° C., $N_D^{25}$ 1.4647, $D_4^{25}$ 0.8675, and 8% residue.

Infrared spectroanalysis of the alcohol fraction indicated that it was an unsaturated primary alcohol having a disubstituted terminal methylene group and a trisubstituted ethylenic bond absorption as shown by the presence of the characteristic primary alcohol, disubstituted terminal methylene group and trisubstituted ethylenic bond absorptions at $9.6\mu$ and $11.3\mu$ and $12.3\mu$, respectively. The catalytic addition of two moles of hydrogen to the alcohol fraction in the presence of 0.2% by weight of $PtO_2$ at 25–35° C. under a hydrogen pressure of 40–60 p.s.i.g. gave 2,6-dimethyl-octane-3-carbinol as shown by comparison of its infrared spectrum with the spectrum of 2,6-dimethyl-octane-3-carbinol, B.P. $_{10\ mm.}$ 107–109° C., $N_D^{25}$ 1.4503, $D_4^{25}$ 0.8609, prepared by hydrogenation of 2,6-dimethyl-1-octene-3-carbinol prepared as in Example 4. The spectra were identical. From the above data, it is evident that the alcohol is 2,6-dimethyl-1,6-octadiene-3-carbinol.

Example 6

Five hundred grams of 2,6-dimethyl-2,7-octadiene and 118 grams of paraformaldehyde, 91%, were heated in an autoclave at 250–260° C. for 8 hours. The maximum pressure developed was 300 p.s.i.g. The reaction product was saponified as shown in the previous example. Five hundred twenty-seven grams of saponified oil was recovered. The oils were fractionated and the fractions were analyzed by infrared spectroanalysis. The analysis showed that the saponified oil was 60–63% unchanged 2,6-dimethyl-2,7-octadiene, 25–30% 2,6-dimethyl-1,7-octadiene-3-carbinol, B.P. $_{10\ mm.}$ 107° C., $N_D^{25}$ 1.4676, $D_4^{25}$ 0.8837, and 11% residue.

Infrared spectroanalysis of the alcohol fraction indicated that it was an unsaturated primary alcohol having a monosubstituted and a disubstituted terminal methylene group. The catalytic addition of 2 moles of hydrogen to the alcohol gave 2,6-dimethyl-octane-3-carbinol as determined by infrared spectroanalysis. From the above data it is evident that the primary alcohol is 2,6-dimethyl-1,7-octadiene-3-carbinol.

Example 7

Five hundred grams of 2-methyl-6-methylene-2-octene, prepared as shown in Example 1, and 118 grams of paraformaldehyde were heated in an autoclave at 250–260° C. for 8 hours. The reaction product was saponified as shown in the previous examples to give 517 grams of saponified oil. The oil was fractionated and the fractions were analyzed by infrared spectroanalysis. The analysis indicated that the saponified oil was 60–65% unchanged 2-methyl-6-methylene-2-octene, 18–20% 2,6-dimethylene-octane-3-carbinol, B.P. $_{10\ mm.}$ 106–107°, $N_D^{25}$ 1.4740, $D_4^{25}$ 0.8843, 6–8% 2-methyl-6-ethyl-2,5-octadiene-8-ol or 2-methyl-6-ethylidene-2-octene-8-ol, B.P. $_{10\ mm.}$ 117–117.5° C., $N_D^{25}$ 1.4760, $D_4^{25}$ 0.8796, and 12% residue.

Infrared spectroanalysis of the alcohol fraction boiling at 106–107° C. at 10 mm. indicated that it was an unsaturated primary alcohol having 2 disubstituted terminal groups as shown by the intensity of characteristic primary alcohol and disubstituted terminal methylene absorptions in the infrared spectrum at $9.6\mu$ and $11.3\mu$, respectively. Catalytic addition of 2 moles of hydrogen to this fraction gave 2,6-dimethyl-octane-3-carbinol as shown by infrared spectroanalysis. From the above data it is evident that the fraction boiling at 106–107° C. at 10 mm. is 2,6-dimethylene-octane-3-carbinol. This alcohol can also be called 2-methyl-6-methylene-1-octene-3-carbinol.

Infrared spectroanalysis of the fraction boiling at 117–117.5° C. indicated that it was a primary alcohol containing 2 trisubstituted ethylenic bonds as shown by the intensity of the characteristic trisubstituted ethylenic bond absorption in the infrared spectrum at $10.3\mu$, Catalytic addition of 2 moles of hydrogen to the alcohol gave 2-methyl-6-ethyl-octane-8-ol, B.P.$_{10\ mm.}$ 114° C., $N_D^{25}$ 1.4398, $D_4^{25}$ 0.835, J.A.C.S. 74, 4292 (1952) as shown by infrared spectroanalysis.

From the above data it is evident that the alcohol fraction boil at 117–117.5° C. at 10 mm. is 2-methyl-6-ethyl-2,5-octadiene-8-ol or 2-methyl-6-ethylidene-2-octene-8-ol.

*Example 8*

Two hundred grams of 2-methyl-6-methylene-2-octene, 44 grams of paraformaldehyde, 91%, and 175 grams of glacial acetic acid were heated in an autoclave at 150–160° C. for 8 hours. The reaction product was then washed to remove acetic acid. Fractionation of the washed oil, 243 grams, followed by infrared spectroanalysis of the fractions showed it to be 46% unchanged 2-methyl-6-methylene-2-octene, 47% 2-methyl-6-methylene-1-octene-3-carbinyl acetate, B.P.$_{10\ mm.}$ 118–120° C., $N_D^{25}$ 1.4622, $D_4^{25}$ 0.9211, and 7% residue.

*Example 9*

Two hundred grams of 2,6-dimethyl-2-octene and 44 grams of paraformaldehyde, 91%, were heated at 250–260° C. for 8 hours. The reaction product was washed with a 10% NaOH solution to remove unreacted formaldehyde. Two hundred and seven grams of oil was recovered and fractionated at 10 mm. pressure. Infrared spectro-analysis of the fractions indicated that the reaction product was 62–65% unchanged 2,6-demethyl-2-octene, 15–20% 2,6-dimethyl-1-octene-3-carbinyl formate, B.P.$_{10\ mm.}$ 101–102° C., 8–10% 2,6-dimethyl-1-octene-3-carbinol and 9% residue.

*Example 10*

Seventy-five grams of 2,6-dimethyl-1,6-octadiene-3-carbinol and 100 grams of acetic anhydride were heated at reflux for 2 hours, 120–140° C. The acetic acid and excess acetic anhydride were distilled off to give 94 grams of 2,6 - dimethyl - 1,6 - octadiene - 3 - carbinyl acetate, B.P.$_{10\ mm.}$ 116–118° C., $N_D^{25}$ 1.4603, $D_4^{25}$ 0.9129.

*Example 11*

Fifty grams of 2,6-dimethyl-2-octene, 11 grams of paraformaldehyde, 91%, and 50 grams of formic acid, 90% were heated at reflux, 115–120° C., for 8 hours. The reaction product was then washed and saponified to give a reaction product that contained 60–65% unchanged 2,6-dimethyl-2-octene and 30–35% 2,6-dimethyl-1-octene-3-carbinol as determined by infrared spectroanalysis.

*Example 12*

Fifty grams of 2,6-dimethyl-2-octene, 11 grams of paraformaldehyde, 91%, 40 grams butyric acid and 10 grams of formic acid, 90%, were heated at 115–120° C. for 8 hours. The reaction product was then washed and saponified with a 25% NaOH solution to give 60–65% unchanged 2,6-dimethyl-2-octene and 35–40% 2,6-dimethyl-1-octene-3-carbinol as determined by infrared spectroanalysis.

*Example 13*

Fifty grams of 2,6-dimethyl-2-octene, 11 grams of paraformaldehyde, 91%, 40 grams of maleic acid and 10 grams of formic acid, 90%, were heated at 115–120° C. for 8 hours. The reaction product was washed and saponified with a 25% NaOH solution to give 80–85% unchanged 2,6-dimethyl-2-octene and 15–20% 2,6-dimethyl-1-octene-3-carbinol as determined by infrared spectroanalysis.

*Example 14*

Fifty grams of 2,6-dimethyl-2-octene, 11 grams of paraformaldehyde and 50 grams of butyric acid were heated at 115–120° C. for 8 hours. The reaction product was washed and saponified with a 25% NaOH solution to give 90–95% unchanged 2,6-dimethyl-2-octene and 5–10% 2,6-dimethyl-1-octene-3-carbinol as determined by infrared spectroanalysis.

*Example 15*

Example 14 is repeated except that the reactants are heated at 160° C. in an autoclave. The reaction mixture is treated as before and the analysis shows about 30% 2,6-dimethyl-1-octene-3-carbinol.

As can be readily seen from the examples, the addition of the formaldehyde takes place in each case to produce an ester of a $C_{11}$, primary, unsaturated, aliphatic hydrocarbon, monohydric alcohol having an unbroken chain of 8 carbon atoms.

All of the $C_{11}$ alcohols and their esters described above possess distinctive pleasant characteristic odors and are useful in perfumery. Since they are producible from readily available raw materials, they can be produced in adequate amounts without depending on fluctuating and limited supplies of essential oils.

Having described the invention, what is claimed is:

1. The process which consists essentially in heating an unsaturated non-conjugated aliphatic $C_{10}$ hydrocarbon having an unbroken chain of 8 carbon atoms, a methyl substituent at the 2-position, a hydrocarbon substituent at the 6-position and a double bond in the 2–3 position of said chain, said hydrocarbon having a greater degree of saturation than that of an aliphatic hydrocarbon of the formula $C_{10}H_{16}$ with formaldehyde under substantially anhydrous conditions in the presence of a low molecular weight carboxylic acid at a temperature in the range of about 130° C. to about 300° C. to form an ester of a $C_{11}$, primary, unsaturated, aliphatic hydrocarbon, monohydric alcohol having an unbroken chain of 8-carbon atoms.

2. The process of claim 1 in which the acyloxy radical is produced in situ from formaldehyde by heating at a temperature above about 240° C.

3. The process of claim 1 in which the acyloxy radical is provided by addition of a low molecular weight carboxylic acid.

4. The process which consists essentially in heating 2,6-dimethyl-2-octene with formaldehyde in the presence of a low molecular weight carboxylic acid at a temperature in the range of about 130° C. to about 300° C. to form an ester of a $C_{11}$, primary, unsaturated, aliphatic hydrocarbon, monohydric alcohol having an unbroken chain of 8 carbon atoms.

5. The process which consists essentially in heating 2,6-dimethyl-2,7-octadiene with formaldehyde in the presence of a low molecular weight carboxylic acid at a temperature in the range of about 130° C. to about 300° C. to form an ester of a $C_{11}$, primary, unsaturated, aliphatic hydrocarbon, monohydric alcohol having an unbroken chain of 8 carbon atoms.

6. The process which consists essentially in heating 2,6-dimethyl-2,6-octadiene with formaldehyde in the presence of a low molecular weight carboxylic acid at a temperature in the range of about 130° C. to about 300° C. to form an ester of a $C_{11}$, primary, unsaturated, aliphatic hydrocarbon, monohydric alcohol having an unbroken chain of 8 carbon atoms.

7. The process which consists essentially in heating 2-methyl-6-methylene-2- octene with formaldehyde in the presence of a low molecular weight carboxylic acid at a temperature in the range of about 130° C. to about 300° C. to form an ester of a $C_{11}$, primary, unsaturated, aliphatic hydrocarbon, monohydric alcohol having an unbroken chain of 8 carbon atoms.

8. The process as defined in claim 1 in which the substituent in the 6-position is a methyl group.

9. A $C_{11}$ primary unsaturated aliphatic hydrocarbon monohydric alcohol having an unbroken chain of 8 carbon atoms possessing a double bond in the 1-position, a methyl group in the 2-position, a carbinol group in the 3-position and a single-carbon-atom-containing hydrocarbon substituent in the 6-position, said alcohol having a greater degree of saturation than that of an alloocimene carbinol of the empirical formula $C_{11}H_{18}O$.

10. 2,6-dimethyl-1-octene-3-carbinol.
11. 2,6-dimethyl-1,7-octadiene-3-carbinol.
12. 2,6-dimethyl-1,6-octadiene-3-carbinol.
13. 2-methyl-6-methylene-1-octene-3-carbinol.
14. An ester of an alcohol of claim 9 with a lower molecular weight carboxylic acid.
15. An alcohol as defined in claim 9 in which the substituent in the 6-position is a methyl group.

References Cited in the file of this patent

UNITED STATES PATENTS

| | | |
|---|---|---|
| 2,246,285 | Arundale et al. | June 17, 1941 |
| 2,308,192 | Mikeska et al. | Jan. 12, 1943 |
| 2,335,027 | Ritter | Nov. 23, 1943 |
| 2,340,294 | Bain | Feb. 1, 1944 |
| 2,443,409 | Whitner | June 15, 1948 |
| 2,624,766 | Butler | Jan. 6, 1953 |

FOREIGN PATENTS

| | | |
|---|---|---|
| 657,497 | Great Britain | Sept. 19, 1951 |

OTHER REFERENCES

"Beilstein," vol. 1, 2nd Suppl., System #25, page 500, item #10.

Braun et al.: Ber. Dent. Chem. 57B (1924) 381–2.

Sabetay et al.: Chem. Abstracts 24 (1930), 5718.

Zaar Chem. Abstracts 24 (1930), 2107.

Winter et al.: Chem. Abstracts 42 (1948), 3740c.

Blomquist et al.: J.A.C.S., vol. 74, 4073 (Aug. 20, 1952).

Walker: "Formaldehyde" (2nd edit.), Reinhold, N.Y., 1953; pp. 326–35.

Royals: "Advanced Organic Chemistry," Prentice-Hall, Englewood Cliffs, N.J., 1954; pp. 386–8 246, 247.